US012678866B2

(12) United States Patent
Schmid

(10) Patent No.: US 12,678,866 B2
(45) Date of Patent: Jul. 14, 2026

(54) CUTTING TOOL SYSTEM COMPONENT, IN PARTICULAR CUTTING TOOL OR CUTTING TOOL HOLDER

(71) Applicant: KENNAMETAL INC., Latrobe, PA (US)

(72) Inventor: Dominik Schmid, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 778 days.

(21) Appl. No.: 17/736,373

(22) Filed: May 4, 2022

(65) Prior Publication Data

US 2022/0355393 A1      Nov. 10, 2022

(30) Foreign Application Priority Data

May 5, 2021      (DE) .......................... 102021111873.5

(51) Int. Cl.
B23B 51/06          (2006.01)
(52) U.S. Cl.
CPC .................................. B23B 51/068 (2022.01)
(58) Field of Classification Search
CPC ....... B23B 27/10; B23B 29/12; B23B 51/068;
B23B 51/06; B23B 2250/12; B23C 5/28;
B23C 2250/12
See application file for complete search history.

(56) References Cited

U.S. PATENT DOCUMENTS

| | | | |
|---|---|---|---|
| 3,889,520 A | 6/1975 | Stoferle et al. | |
| 5,230,389 A * | 7/1993 | Besson ..................... | E21B 7/18 |
| | | | 137/826 |
| 2005/0005679 A1 | 1/2005 | Dingfelder et al. | |
| 2005/0160571 A1 | 7/2005 | Kuhn et al. | |
| 2006/0123801 A1 * | 6/2006 | Jackson ............. | B23Q 11/1061 |
| | | | 62/52.1 |
| 2007/0069406 A1 * | 3/2007 | Phouybanhdyt ..... | A61B 6/4488 |
| | | | 261/153 |
| 2018/0104750 A1 | 4/2018 | Levasseur et al. | |

FOREIGN PATENT DOCUMENTS

| | | | |
|---|---|---|---|
| DE | 10006727 A1 | 8/2001 | |
| DE | 102006052602 A1 | 4/2008 | |
| EP | 4197676 A1 * | 6/2023 ............. B23B 51/06 |
| EP | 4197677 A1 | 6/2023 | |
| WO | 2023110176 A1 | 6/2023 | |
| WO | 2023110177 A1 | 6/2023 | |

OTHER PUBLICATIONS

Mar. 31, 2024 Foreign Office Action Chinese Application No. CN202210479370.2, 2 Pages.

* cited by examiner

*Primary Examiner* — Sunil K Singh
*Assistant Examiner* — Eric Daniel Whitmire
(74) *Attorney, Agent, or Firm* — John A. Wilaj, Jr.

(57) ABSTRACT

A cutting tool system component, in particular a cutting tool or a cutting tool holder, is described. The cutting tool system component comprises a base body comprising a fluid inlet for supplying cooling and/or lubricating fluid to the cutting tool system component. A fluidic actuator and/or a fluidic detector is arranged inside the base body that has or have a fluid-conducting connection to the fluid inlet.

16 Claims, 7 Drawing Sheets

CUTTING TOOL SYSTEM COMPONENT, IN PARTICULAR CUTTING TOOL OR CUTTING TOOL HOLDER

RELATED APPLICATION DATA

The present application claims priority pursuant to 35 U.S.C. § 119(a) to German Patent Application Number 102021111873.5 filed May 5, 2021, which is incorporated herein by reference in its entirety.

FIELD

The invention relates to a cutting tool system component, in particular to a cutting tool or a cutting tool holder having a base body comprising a fluid inlet for supplying cooling and/or lubricating fluid to the cutting tool system component.

BACKGROUND

Such cutting tool components are known from the prior art. More particularly, the cutting tool system components are cutting tools or cutting tool holders. The cooling and/or lubricating fluid is in this case used to cool the cutting tool and/or a workpiece being machined therewith. Alternatively or additionally, it ensures that an interface between the cutting tool and a workpiece machined therewith is lubricated.

In numerous applications, it is desirable to sense the parameters and/or characteristic values of a cutting process directly on the cutting tool or on the cutting tool holder by means of the cutting tool system component, for example by means of the cutting tool and/or the cutting tool holder, in order to more readily monitor and/or control the cutting process. In addition, it is often desirable to adapt the cutting tool system components, e.g. the cutting tool and/or the cutting tool holder, to different applications. Such applications differ, for example, by the material to be processed or by the conditions under which the cutting tool system component, in particular the cutting tool, engages with the workpiece. For example, when planing an outer surface of a workpiece, a milling machine interacts with a workpiece to be machined in a different manner than when manufacturing a groove. The same applies to turning tools.

In order to comply with such needs and requirements, cutting tool system components in the form of cutting tools or cutting tool holders can be equipped with sensors and electrically operated actuators. In order to do so, some effort must be accepted to supply electrical power to the sensors and actuators. In particular, when the cutting tool is embodied as a rotary cutting tool, comparatively elaborate and costly rotary feedthroughs need to be used.

SUMMARY

The object of the invention is thus to specify a cutting tool system component into which sensors or detectors as well as actuators can be easily integrated. The object is to readily supply power to these.

The task is solved by a cutting tool system component of the above-mentioned type, which is in particular configured as a cutting tool or as a cutting tool holder and on which a fluidic actuator and/or a fluidic detector is or are arranged inside the base body, and which is or has a fluid-conducting connection to the fluid inlet. A fluidic actuator is understood to be an actuator that utilizes fluid flow or pressurized fluid as a source of energy. Such an actuator therefore does not require an electrical power supply and can therefore be easily integrated into a base body. This is particularly true for cutting tools and/or cutting tool holders, as they are often already provided with a fluid inlet for supplying cooling and/or lubricating fluid. Accordingly, a fluidic detector is understood to mean a detector that is powered by a fluid flow and/or a pressurized fluid. Thus, such a detector does not require an electrical power supply. In a cutting tool or a cutting tool holder, the fluidic detector also uses a cooling and/or lubricating fluid that is provided anyway. The supply of cooling and/or lubricating fluid to cutting tools and cutting tool holders is well established in the prior art. In particular, as compared to an electrical power supply of a cutting tool system component, there is no need to provide rotary feedthroughs for this purpose. Thus, supplying cooling and/or lubricating fluid to a cutting tool system component is structurally simple and robust. The fluidic actuator and the fluidic detector can then be readily supplied with energy.

In order to simplify the discussion, a cooling and/or lubricating fluid is hereinafter also simply referred to as a cooling fluid or lubricating fluid. The terms cooling fluid and lubricating fluid, therefore, refer to a cooling and/or lubricating fluid, respectively. Further, the term coolant is understood as a synonym for the term cooling fluid and the term lubricant is understood as a synonym for the term lubrication fluid.

The cutting tool system component according to the present invention is in particular a cutting tool. In this regard, the cutting tool can be a milling tool, a turning tool, or a drilling tool.

In the event that the cutting tool system component is configured as a cutting tool, it can have a one-part or multi-part design. For a one-part design of the cutting tool, a cutting edge of same is integrated into the base body. When the cutting tool has multi-part design, it is preferably constructed from a base body and at least one cutting insert attached to the same. In this context, the cutting insert represents an add-on part of the cutting tool system component. A cutting edge is then provided on the cutting insert. In a special case, the cutting insert is an indexing insert.

The cutting tool system component can also be a cutting tool holder. In this case, the cutting tool holder can be a turning tool holder, a milling tool holder, or a drilling tool holder. Milling tool holders and drilling tool holders are often also referred to as chucks.

In one embodiment, the fluidic actuator comprises a fluidic oscillator. A fluidic oscillator is understood to mean a flow geometry comprising a fluid inlet and a fluid outlet connected to a main flow channel. Further, at least one return flow channel leads from the fluid outlet to the fluid inlet. If the fluid inlet is supplied with a fluid, it flows along one of the walls of the main flow channel. A portion of the fluid flows back through the return flow channel to the fluid inlet and then rejoins the main flow. As a result, the flow in the main channel is released from the wall and rests against an opposite wall. The phenomenon then also repeats itself on this wall so that a fluid jet exiting the fluidic oscillator at the fluid outlet is moved back and forth. In other words, the fluid jet emitted from the fluidic oscillator oscillates. The frequency of the oscillation depends essentially on the geometry of the oscillator and the provided volumetric flow rate of the fluid. Since a fluid jet emitted from the fluidic oscillator moves back and forth, the fluidic oscillator can be considered a fluidic actuator that causes precisely this movement of the emitted fluid jet. In this way, a cooling and/or lubricating fluid can be emitted in a comparatively large range. This can be achieved with a fluid outlet that is relatively small in diameter. In particular, geometrically sweeping nozzles are not necessary for this purpose. In addition, cooling and/or lubricating fluid can thus be provided locally at high pressures and/or high volumetric flow rates. This is particularly true when compared to a permanently fanned jet. A cyclic variation of the coolant intensity, which can be provided by means of a fluidic oscillator, is also advantageous, for example, for chip removal.

The fluidic oscillator can comprise a fluid outlet, with the fluid outlet directed towards a center section of a cutting edge or a flute. In operation, the fluidic oscillator is further formed to oscillate a fluid jet exiting the fluid outlet relative to the cutting edge or the flute. The fluid jet is preferably guided along the cutting edge or along the flute. Alternatively, however, it is also conceivable to guide the fluid jet perpendicular to the cutting edge or to the flute. It is also possible to guide the fluid jet at an oblique angle to the cutting edge or to the flute. The cutting edge or flute can be provided on a cutting tool, wherein the cutting tool is formed as either a cutting tool system component according to the invention or interacts with a cutting tool holder formed as a cutting tool system component according to the invention. Thus, a cutting edge or flute can be supplied with cooling and/or lubricating fluid in a desired manner. A comparatively simple and small fluid outlet is sufficient for this purpose. In particular, in the event that the fluid outlet is directed towards a flute, the oscillating movement of the fluid jet emitted from the fluid outlet further causes effective removal of chips. In the event that the fluid outlet is directed towards a cutting edge, reliable cooling thereof is achieved.

The fluidic oscillator may also comprise a return flow channel, wherein a wall delimiting the return flow channel is designed at least in sections to be deformable such that a cross section of the return flow channel changes by deforming the wall. As already explained with regard to the function of the fluidic oscillator, the return flow channel is necessary to cause an oscillating movement of the fluid jet emitted at the fluid outlet. The geometry, in particular a cross section, of the return flow channel has a direct impact on the oscillation behavior. Accordingly, the oscillation behavior is directly influenced by changing a cross-section of the return flow channel. For example, this changes a center position or an oscillation amplitude. The wall delimiting the return flow channel can be deformed by coming into contact with an element separate from the cutting tool system component, for example, with a workpiece. Overall, the oscillation behavior of the fluid jet emitted from the fluidic oscillator can be controlled as a function of a contact with an element separate from the cutting tool system component. For example, an emission direction of the fluid is purposefully adjusted when the cutting tool system component comes into contact with a workpiece. This results in a purposeful use of the coolant and/or lubricant adapted to the situation.

In one variant, the fluidic actuator has a tempering surface and a fluid channel section. The fluid channel section has a fluid connection to the fluid inlet and is directed toward the tempering surface such that fluid flowing from the fluid channel section flows along the tempering surface and is deflected as a function of a temperature of the tempering surface. In this context, a special case of the so-called Coanda effect is exploited, which relates to the phenomenon that fluid flow flows along a convex surface, rather than maintaining an original direction of flow and thus detaching from the surface. In addition, this phenomenon is temperature-dependent so that, for a comparatively cold tempering surface, the fluid flowing out of the fluid channel flows substantially along the tempering surface. In contrast, if the temperature of the tempering surface is increased, the fluid jet detaches from the tempering surface, i.e., is deflected from the tempering surface. In other words, the temperature of the tempering surface can control where the fluid flows. The tempering surface can, but need not, be actively heatable. Rather, it is preferred that the tempering surface heats up during operation of the cutting tool system component by interacting with a workpiece. The coolant and/or lubricant is thus directed to different locations within a process zone, i.e. to different locations of the cutting tool and/or a workpiece, depending on a process-related temperature of the tempering surface. This provides effective cooling.

In one variant, for the purpose of detecting an object adjacent to the cutting tool system component, the fluidic detector comprises a detector channel having a fluid-conducting connection to the fluid inlet and terminating in an environment of the cutting tool system component. Thus, when an object is adjacent to the cutting tool system component, particularly in the area of the termination of the detector channel, the detector channel is fully or partially closed. As a result, less or no fluid can flow into the environment through the detector channel compared to the initial state. Consequently, the fluid is redirected and provided at other locations of the cutting tool system component. Thus, by means of the object detection performed by means of the detector channel, a coolant and/or lubricant can be directed to an appropriate location within a process zone as soon as an object adjacent to the cutting tool system component is detected.

The fluidic detector can also be formed by a fluid channel section that has a fluid-conducting connection to the fluid inlet, wherein an add-on part, when seated correctly, completely closes the fluid channel section and, if seated incorrectly, at least partially opens the fluid channel section such that an incorrect seat of the add-on part is detectable by means of the fluidic detector. In particular, the add-on part is a cutting insert. In this context, an incorrect seat also includes a mounting having insufficient torque. The partially opened fluid channel section can in this case terminate into an environment of the cutting tool system component. An incorrect seat of the add-on part is then detected when cooling and/or lubricating fluid exits the cutting tool system component in the area of the add-on part. In its at least partially opened form the fluid channel section can alternatively terminate into a further fluid channel. The incorrect seat of the add-on part can thus be detected by a yet to be explained display device. Such a detector is structurally simple and operates reliably.

The fluidic detector can also be a rotational speed detector comprising a fluid chamber having a fluid-conducting connection to the fluid inlet and having a fluid outlet, wherein when in operation, a pressure of fluid exiting the fluid outlet depends on the rotational speed of the cutting tool system component. Preferably, the fluid chamber is arranged substantially concentrically in relation to an axis of rotation of the cutting tool system component. The pressure of the fluid present within the fluid chamber is affected by centrifugal forces acting while the cutting tool system component is in operation. The fluid exiting the fluid outlet at higher rotational speeds has a higher pressure. A rotational speed of the cutting tool system component can then be easily detected.

According to an embodiment, a fluidic logic element is arranged inside the base body, wherein the fluidic logic element has a fluid-conducting connection to the fluid inlet as well as the fluidic actuator and/or the fluidic detector. The fluidic actuator and/or the fluidic detector can thus be operated as a function of boundary conditions processed by the fluidic logic element. The boundary conditions processed by the fluidic logic element can in this case result from the operation of the cutting tool system component. In this context, a detector channel described above or a fluid channel section already explained, which is sealed by an add-on part, in particular a cutting insert, can form such a boundary condition, i.e. an input value for the logic element. It is also possible to set input values for at least a certain operating time of the cutting tool system component by opening or closing certain fluid channels with plugs.

The fluidic logic element can include a fluidic XOR circuit, a fluidic OR circuit, a fluidic AND circuit, and/or a fluidic NOT circuit. Thus, an exclusive OR circuit, a standard OR circuit, an AND circuit, and/or a NOT circuit can be realized by means of the fluidic logic element. Of course, there can also be a plurality of fluidic logic elements that can be interconnected in any complexity. Even complex logic operations can then be implemented within the cutting tool system component.

The cutting tool system component can also comprise a fluidic display device having a fluid channel section that can either be supplied with cooling and/or lubricating fluid. The fluid channel section is delimited on a first side by a window and by a signal surface on a second side, which is at least partially opposite to the first side. Alternatively, the fluid channel section terminates into an environment of the cutting tool system component. In the first case, the signal surface is formed, for example, by a colored surface. For a human viewer looking through the window, the colored surface appears different depending on whether or not fluid is present in the fluid channel section. For example, in the presence of a fluid, the signal surface may appear darker or in a different color. In the second case, an indication is made when cooling and/or lubricating fluid leaks from the fluid channel into the environment. This is visible to a human viewer. Displays are readily possible in both variants.

Preferably, the base body is manufactured by means of a generative manufacturing process. In particular, the fluidic actuator and/or the fluidic detector and/or the fluidic logic element are manufactured at least in sections by the generative manufacturing process. The base body can thus be manufactured efficiently and inexpensively. In particular, the fluidic actuator and/or the fluidic detector and/or the fluidic logic element can be manufactured without additional manufacturing engineering effort. Of course, the same applies to a fluidic display device coupled to the fluidic actuator and/or the fluidic detector and/or the fluidic logic element. This is favorable for the internal structures present herein, as accessibility for classical machining manufacturing methods is greatly limited. Thus, functionally highly integrated cutting tool system components can be readily created.

BRIEF DESCRIPTION OF THE DRAWINGS

The invention is explained below with reference to various exemplary embodiments that are shown in the accompanying drawings. The drawings show in.

DETAILED DESCRIPTION

Figures 1, 2:
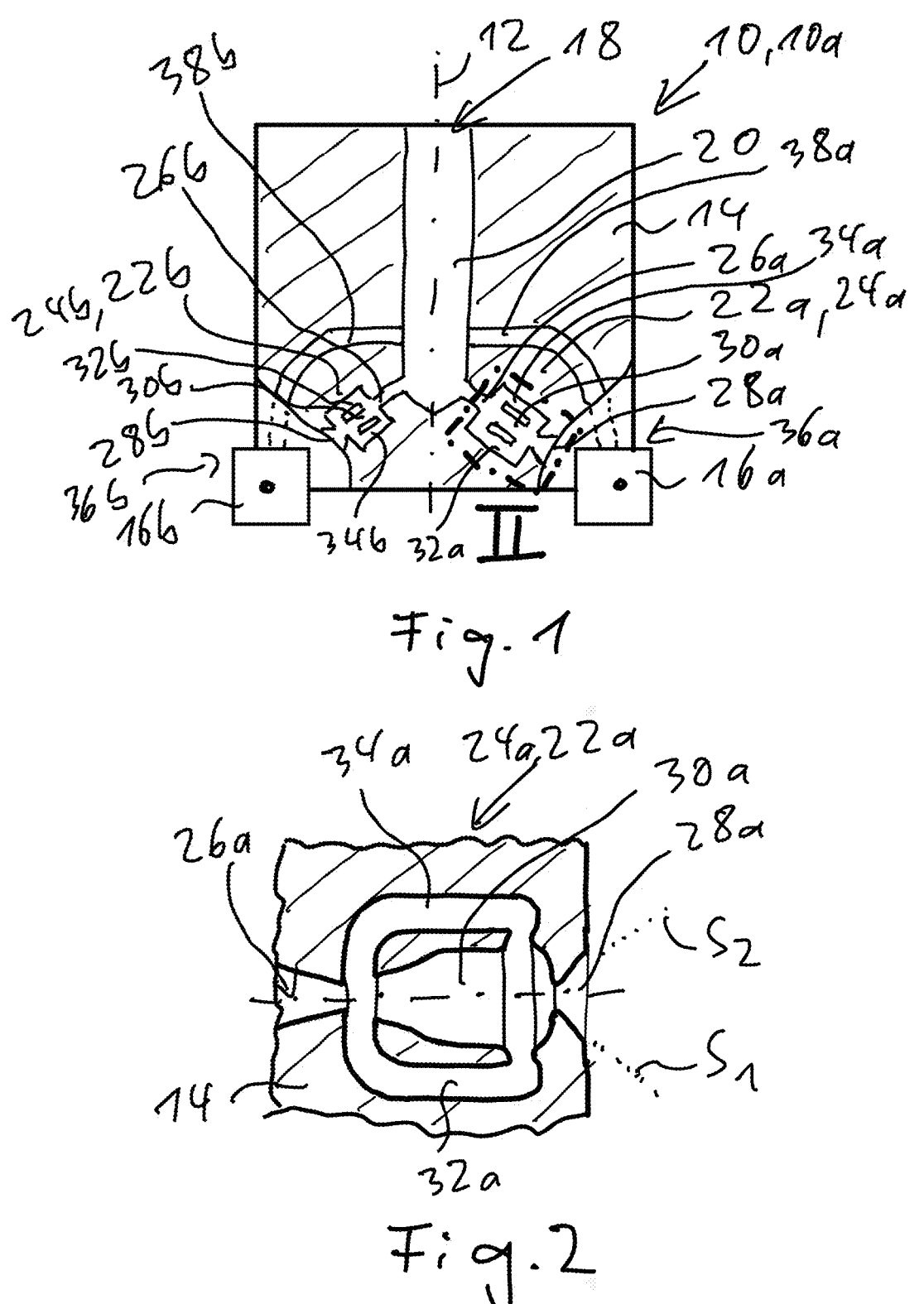
FIG. 1 a cutting tool system component, embodied as a cutting tool, according to a first embodiment in a partially cross-sectional schematic representation, FIG. 2 a detail II of the cutting tool system component in FIG. 1, FIG. 3 a cutting tool system component, embodied as a cutting tool, according to a second embodiment in a partially cross-sectional schematic representation, FIG. 4 a detail IV of the cutting tool in FIG. 3, FIG. 5 a section embodied as a cutting insert of a cutting tool system component according to the invention, embodied as a cutting tool, according to a third embodiment, FIG. 6 a section along a plane VI in FIG. 5 in two different operating states, FIG. 7 a cutting tool system component according to the invention, embodied as a cutting tool, according to a fourth embodiment in a partially cross-sectional schematic representation, wherein the cutting tool system component is in a first operating state, FIG. 8 the cutting tool system component in FIG. 7, wherein the cutting tool system component is in a second operating state, FIG. 9 a cutting tool system component according to the invention, arranged as cutting tool, according to a fifth embodiment in a schematic illustration, FIG. 10 an overview of fluidic logic elements usable in a cutting tool or system component according to the invention, FIG. 11 a usable fluidic display device in two operating states in a cutting tool system according to the invention, and FIG. 12 a cutting tool system component according to the invention arranged as a tool holder in a partially cross-sectional view.

FIG. 1 shows a cutting tool system component 10 formed as cutting tool 10a, according to a first embodiment.

The cutting tool 10a is rotatable in operation about an axis of rotation 12. Accordingly, the cutting tool 10a is a rotary cutting tool. The latter is formed as a milling tool.

The cutting tool 10a comprises a base body 14 to which two cutting inserts 16a, 16b are attached as an example. More generally, the cutting inserts 16a, 16b can be referred to as add-on parts.

Each of the cutting inserts 16a, 16b comprises at least one cutting edge such that cutting operations can be performed in a known manner by means of the cutting tool 10a.

Further, the cutting tool 10a comprises a fluid inlet 18, by which it can be supplied with a cooling and/or lubricating fluid.

The fluid inlet 18 is formed as a termination of a central coolant supply channel 20 formed in the base body 14.

The coolant supply channel 20 also has a fluid connection to two exemplary fluidic actuators 22a, 22b to supply the latter with cooling and/or lubricating fluid. In other words, the fluidic actuators 22a, 22b have a fluid-conducting connection to the fluid inlet 18.

The fluidic actuators 22a, 22b are each formed as fluidic oscillators 24a, 24b.

The fluidic oscillators 24a, 24b each have a fluid inlet 26a, 26b and a fluid outlet 28a, 28b.

The fluid inlets 26a, 26b and the fluid outlets 28a, 28b in this case each have a paired fluid connection to a main flow channel 30a, 30b.

Moreover, each of the fluid inlets 26a, 26b has a fluid connection to the respectively associated fluid outlet 28a, 28b by way of two return flow channels 32a, 32b, 34a, 34b arranged on opposite sides of the main flow channel 30a, 30b.

The fluid outlets 28a, 28b are each directed toward a center portion of a cutting edge on the associated cutting insert 16a, 16b.

Further, when in operation, i.e., when supplied with cooling fluid, the fluidic oscillators 24a, 24b are each formed to oscillatingly guide a fluid jet exiting the respective fluid outlet 28a, 28b along the associated cutting edge. This is illustrated in FIG. 2 by two extreme positions S1, S2 of a fluid jet emitted from fluid outlet 28a, shown only schematically.

In this way, the respective cutting edge can be cooled over its entire length.

The cutting tool 10a is further equipped with two fluidic detectors 36a, 36b.

Fluidic detectors 36a, 36b also have a fluid-conducting connection to the fluid inlet 18.

Each of the fluidic detectors 36a, 36b includes an associated fluid channel section 38a, 38b, each having a fluid connection to the fluid inlet 18.

Also, each fluid channel section 38a, 38b is associated with one of the cutting inserts 16a, 16b, which, when seated correctly, fully closes the associated fluid channel section 38a, 38b. If the respective cutting insert 16a, 16b is seated incorrectly, the associated fluid channel section 38a, 38b is at least partially opened. Thus, if one of the cutting inserts 16a, 16b is seated incorrectly, cooling fluid exits in its vicinity from the cutting tool 10a. In this way, it can easily be recognized that one of the cutting inserts 16a, 16b is not correctly attached to the base body 14.

In other words, the correct seat of the cutting inserts 16a, 16b can be detected.

The cutting tool 10a according to the first embodiment is manufactured by a generative manufacturing process. This applies in particular to the base body 14.

Such a method of manufacture can produce the flow geometries of the fluidic detectors 36a, 36b and also those of the fluidic actuators 22a, 22b. No drilling or milling operations are necessary for this.

Figures 3, 4:
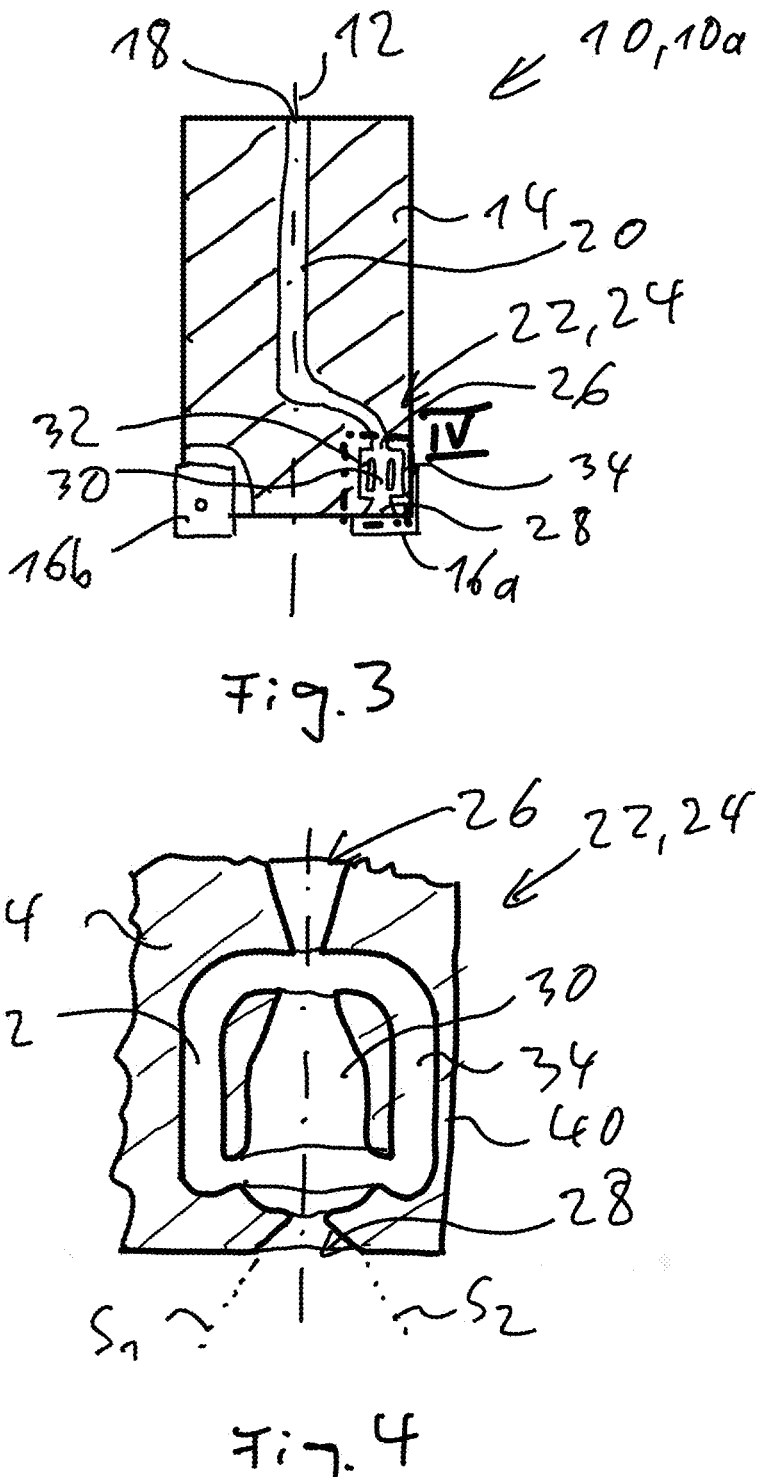

FIG. 3 shows a cutting tool system component 10, which is again formed as cutting tool 10a, according to a second embodiment. Only the differences to the first embodiment will be discussed. The same or corresponding components are labeled with the same reference symbols.

The cutting tool 10a according to the second embodiment also comprises a fluidic actuator 22 in the form of a fluidic oscillator 24. Since only a single fluidic actuator 22 is shown by example, suffixes a, b, are omitted as opposed to explanations pertaining to the first embodiment.

The fluidic oscillator 24 functions in the same way as the fluid oscillators 24a, 24b already explained in connection with the first embodiment. However, the fluidic oscillator 24 in the second embodiment is arranged differently within the base body 14.

In this context, a wall 40 delimiting the return flow channel 34 is designed to be deformable at least in sections. A cross section of the return flow channel 34 can thus be altered by deforming the wall 40.

This happens, for example, when the cutting tool 10a comes into contact with a workpiece during a cutting process.

The deformation of the cross section of the return flow channel 34 changes the properties of the fluidic oscillator 24. Thus, a fluid jet is emitted from the fluid outlet 28 in other ways. A cooling fluid can then be directed to a desired location when the cutting tool 10a comes into contact with the workpiece.

Figure 5:
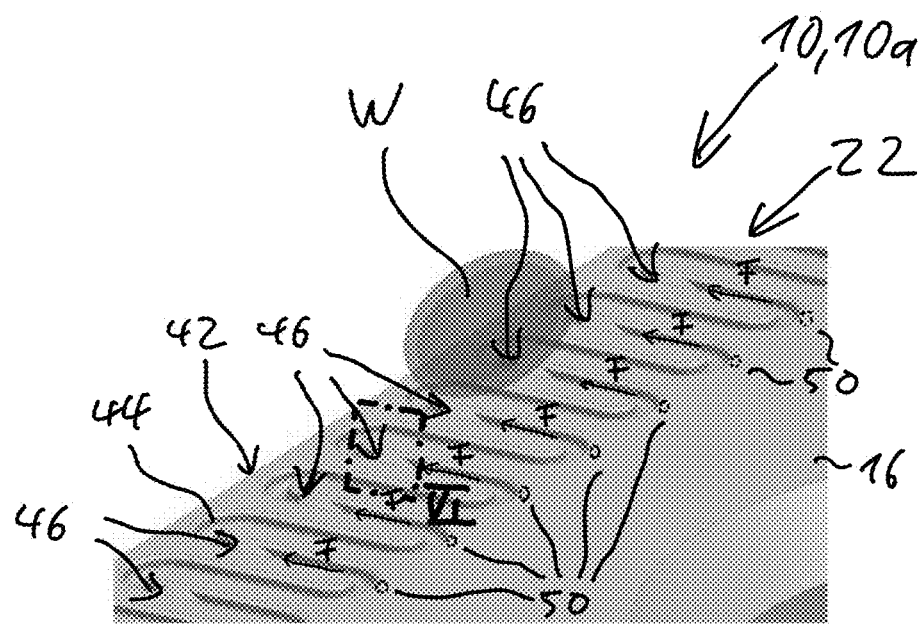

FIG. 5 shows a portion of a cutting tool system component 10 formed as a cutting tool 10a as before, according to a third embodiment. Only the differences to the already explained embodiments are again discussed. The same or corresponding components are labeled with the same reference symbols.

The portion of cutting tool 10a shown in FIG. 5 is formed by a cutting insert 16. Because only a single cutting insert is shown, suffix a, b is again omitted.

The cutting insert 16 has a cutting edge 42. A fluid-conducting channel 44 runs in a meander shape along the latter. Flow-conducting geometries 46 are arranged at regular intervals within the fluid-conducting channel 44.

Figure 6:
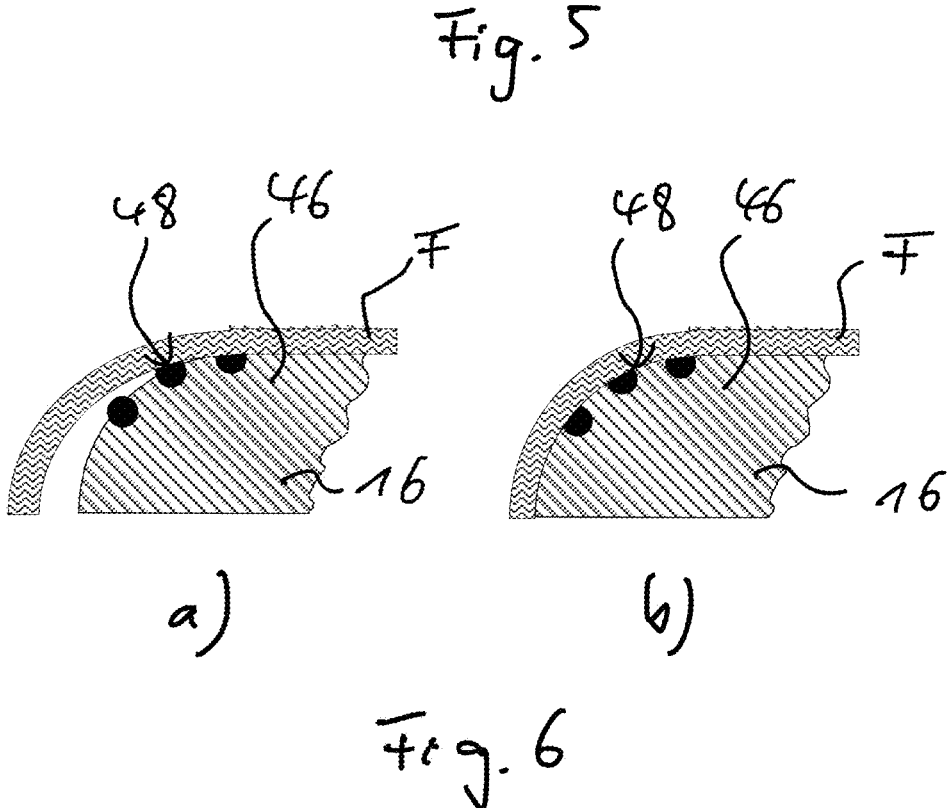

The flow-conducting geometries 46 each comprise a tempering surface 48, which is marked by three dots each in the two illustrations of FIG. 6.

In the embodiment shown, the tempering surfaces 48 heat up when the cutting edge 42 engages with a workpiece.

Further, only schematically shown fluid channel sections 50 are arranged on the cutting insert 16, each directed towards an associated tempering surface 48. A fluid jet F, originating from the fluid channel section 50, can thus be directed towards an associated flow-conducting geometry 46.

A phenomenon also known as the Coanda effect is exploited in the area of the tempering surfaces 48. This means that in a state where the tempering surfaces 48 are relatively cold, the respectively associated fluid jet F runs along the tempering surfaces 48 (see FIG. 6 b)). However, when the tempering surface 48 is warm, the fluid jet F is deflected from the tempering surface 48 (see FIG. 6 a)).

In FIG. 5, a comparatively warm zone of the cutting insert 16 is labeled as W. In this area, the fluid jet F is then deflected towards the cutting edge 42 so that it can be used there for cooling purposes.

In this manner, after actively influencing a direction of the fluid jet F, the tempering surfaces 48 utilizing the Coanda effect can in conjunction with the associated fluid channel sections 50 also be considered fluidic actuators 22. For reasons of better clarity, only one fluidic actuator is labeled with a reference symbol in FIG. 5.

Figure 7:
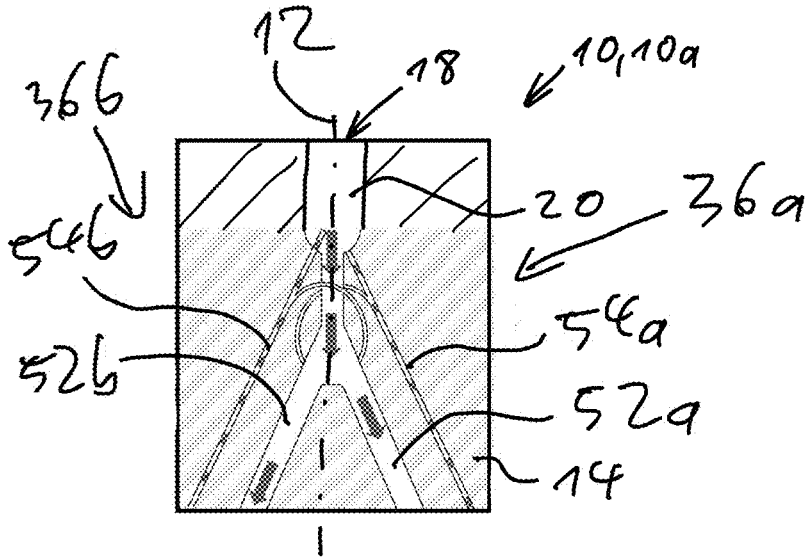
Figure 8:
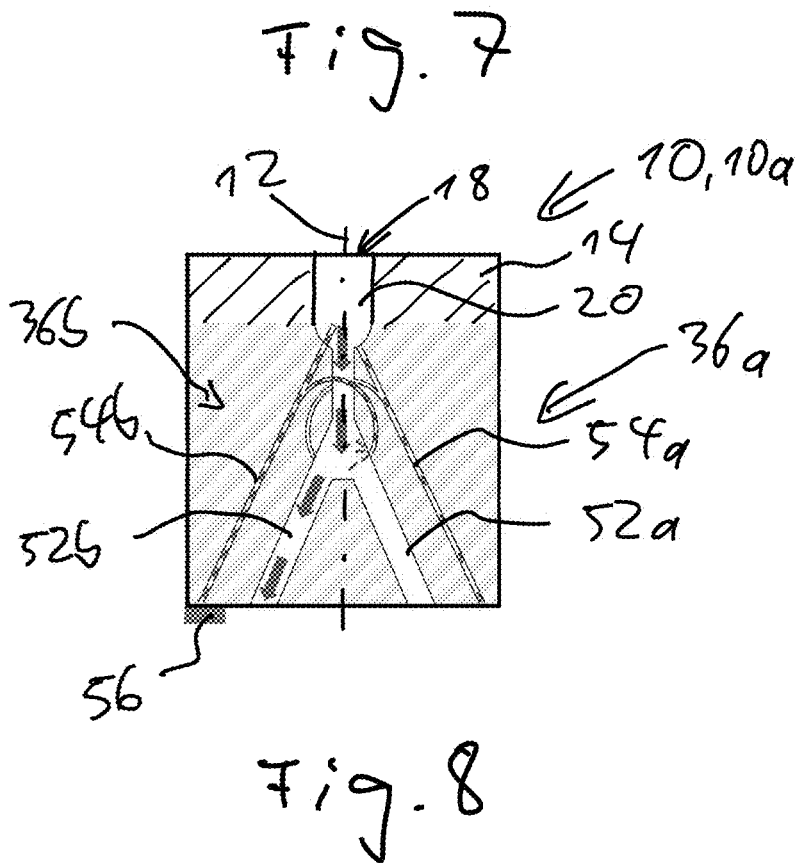

A fourth embodiment of the cutting tool system component 10, again embodied as cutting tool 10a, is shown in FIGS. 7 and 8. Again, only the differences to the aforementioned embodiments will be discussed. The same or corresponding components are labeled with the same reference symbols.

On the cutting tool 10a according to the fourth embodiment, the coolant supply channel 20 branches into a first fluid outlet channel 52a and a second fluid outlet channel 52b.

Detector channels 54a, 54b are also provided. Each of the detector channels 54a, 54b has a fluid-conducting connection to the fluid inlet 18. Moreover, the two detector channels 54a, 54b terminate into an environment of the cutting tool 10a.

In an operating state wherein the cutting tool 10a is located at some distance from a workpiece, substantially the same amount of coolant that is supplied to the cutting tool 10a over the fluid inlet 18 is then directed back into the environment through each of the fluid outlet channels 52a, 52b. Moreover, substantially the same amount of cooling fluid is also respectively directed into the environment over the two detector channels 54a, 54b. However, a fluid flow deflected by the detector channels 54a, 54b is significantly smaller than a fluid flow directed by the fluid outlet channels 52a, 52b (see FIG. 7 and arrows drawn therein).

However, when the cutting tool 10a engages into a workpiece 56, which is only represented schematically by a block in FIG. 8, one of the detector channels 54a, 54b is at least partially closed. In the present case, the detector channel 54b is completely closed by the workpiece 56.

This results in substantially all coolant now being emitted through the fluid outlet channel 52b from the cutting tool 10a. Thus, more coolant is directed to the location where the cutting tool 10a contacts the workpiece 56 compared to the initial state shown in FIG. 7.

Figure 9:
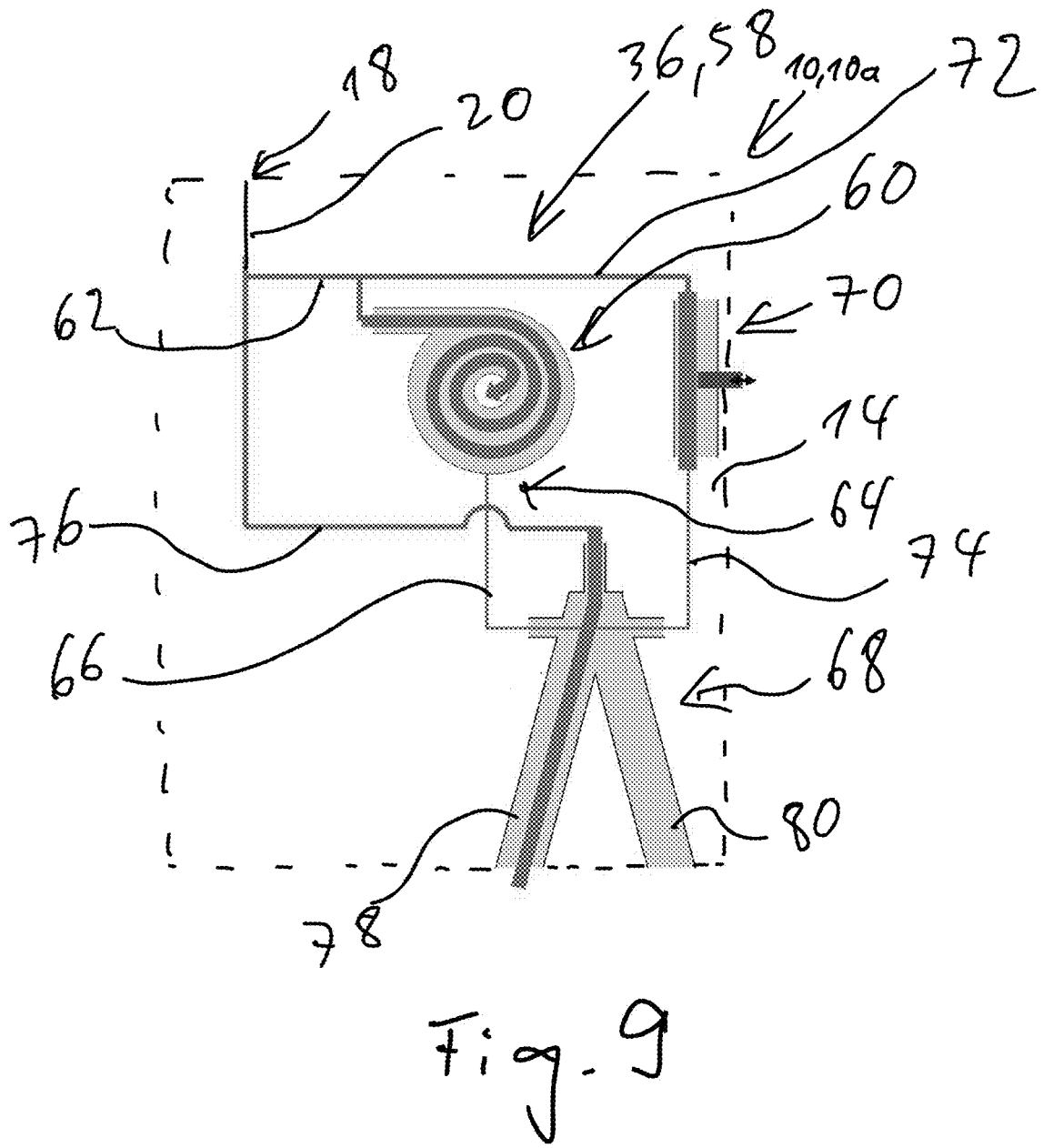

A cutting tool system component 10 according to a fifth embodiment is shown in FIG. 9. As before, the cutting tool system component 10 is a cutting tool 10a. Again, only the differences to the aforementioned embodiments will be discussed. The same or corresponding components are again labeled with the same reference symbols.

The cutting tool 10a according to the fifth embodiment again comprises a fluidic detector 36.

The latter is formed as a rotational speed detector 58.

It includes a fluid chamber 60 having a fluid-conducting connection to the central coolant supply channel 20 over a supply channel 62. The fluid chamber 60 also includes a fluid outlet 64 connected to a fluidic comparator 68 over a further fluid channel 66.

The detector 36 further comprises an adjustable fluidic resistive element 70. The latter is supplied with fluid over a fluid channel 72. The resistive element 70 is also connected to the fluidic comparator 68 over an associated outlet channel 74. The resistive element 70 is substantially designed to adjust a fluidic flow resistance.

When in operation, e.g. when supplied with fluid, the rotational speed detector 58 is formed such that a pressure at the fluid outlet 64 is a function of a rotational speed of the cutting tool 10a. This is the case because, when in operation, the centrifugal forces acting on the fluid present in the fluid chamber 60 are the greater the faster the cutting tool 10a rotates.

In comparator 68, this pressure is compared to the pressure prevailing in outlet channel 74.

To this end, a main fluid flow is supplied to the comparator 68 over a supply channel 76. Fluid flows emitted from the outlet channel 74 and from the fluid channel 66 are introduced laterally into the main fluid flow.

Thus, when a pressure in outlet channel 74 is greater than in fluid channel 66, the main fluid flow is directed into a first outlet channel 78. In other words, the main fluid flow is in this case deflected in a direction facing away from an outlet channel 74.

Conversely, the fluid flow is directed into the outlet channel 80.

In this context, a rotational speed limit of the cutting tool 10a can be adjusted by means of the resistive element 70. If the cutting tool 10a rotates faster, i.e. if a pressure in the fluid channel 66 is greater than in the outlet channel 74, the fluid is emitted over the outlet channel 80. If a rotational speed is below the rotational speed limit, and the pressure in the fluid channel 66 is therefore less than in the outlet channel 74, the fluid is emitted over the outlet channel 78.

The outlet channel 78, 80 is therefore selected as a function of the rotational speed. For example, it is in this manner conceivable to use different outlet channels 78, 80 depending on whether the cutting tool 10a is used for a roughing operation or for a finishing operation.

Figure 10:
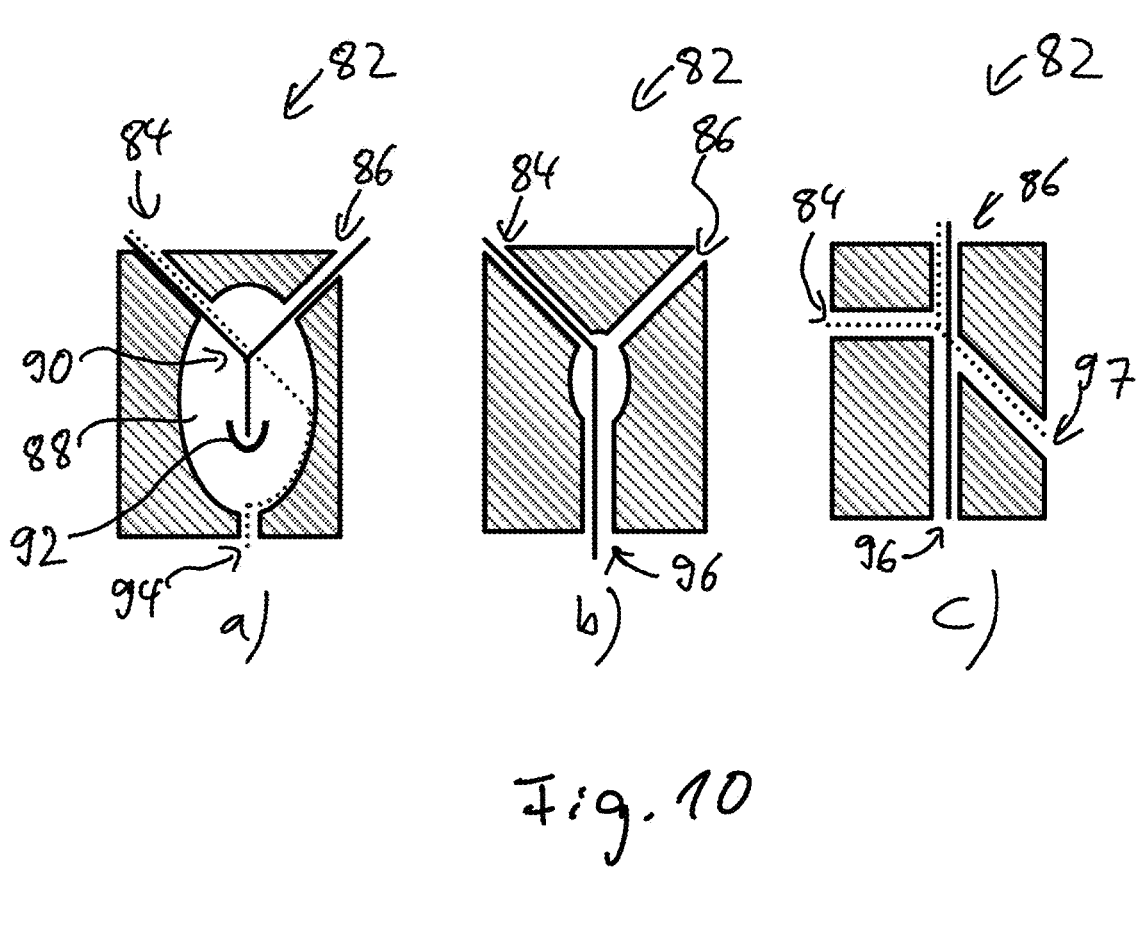

Various fluidic logic elements 82 are shown in FIG. 10, which can be used in connection with all of the aforementioned embodiments.

FIG. 10 a) then shows a fluidic circuit representing a fluidic AND circuit and a fluidic XOR circuit.

The circuit utilizes two inlet channels labeled 84 and 86.

Both inlet channels 84, 86 open into a fluid chamber 88 and are oriented such that fluid jets originating from the inlet channels 84, 86 meet in a region 90. This region is arranged over a drain trough 92, also referred to as an AND trough.

The drain trough 92 terminates in a fluid outlet not shown in greater detail. However, the drain trough 92 is only supplied with cooling fluid when fluid jets are emitted from both inlet channels 84, 86 that meet in the region 90.

Thus, a fluidic AND circuit is formed.

A case wherein only one of the inlet channels 84, 86 is supplied with cooling fluid is also shown in FIG. 10 a). A fluid jet is only emitted from inlet channel 84, but not from inlet channel 86. Thus, no fluid jets can meet in region 90. The fluid jet originating from the inlet channel 84 thus impacts a wall of the fluid chamber 88 and exits through a fluid outlet 94 (see fluid jet shown as a dotted line).

Thus, a fluidic XOR circuit is formed.

FIG. 10 b) shows a fluidic OR circuit.

The two inlet channels 84, 86 join together to form a single outlet channel 96. Cooling fluid is thus always supplied in the outlet channel 96 when one of the inlet channels 84, 86 supplies cooling fluid.

FIG. 10c) shows a fluidic NOT circuit.

The latter also comprises two inlet channels 84, 86 and an outlet channel 96. Further, a deflection channel 97 is provided.

The inlet channel 86 is in this case designed to supply coolant and/or lubricant. From a signaling point of view, this channel acts as a power supply.

An input signal is provided at the inlet channel 84 from a signaling point of view.

The channels formed by the inlet channels 84, 86, the outlet channel 96, and the deflection channel 97 intersect such that when the inlet channel 84 is supplied with coolant and/or lubricant, the coolant and/or lubricant supplied by the inlet channel 86 is deflected such that it exits the logic element 82 through the deflection channel 97.

Coolant and/or lubricant therefore does not arrive at the outlet channel 96. The fluidic signal provided at the inlet channel 84 is therefore negated.

In the event that no coolant and/or lubricant is present at the inlet channel 84, the coolant and/or lubricant supplied through the inlet channel 86 passes directly to the outlet channel 96.

The fluidic signal provided on the inlet channel 84 is then also negated in this manner.

The aforementioned fluidic logic elements 82 may be used in any of the embodiments discussed above. The logic element 82 must have a fluid-conducting connection to the fluid inlet 18. In addition, logic element 82 always has a fluid connection to a fluidic actuator 22, 22a, 22b or detector 36, 36a, 36b.

In this context, it is for example conceivable to couple the detectors 36 of the first, fourth, and/or fifth embodiments with fluidic logic elements 82.

Figure 11:
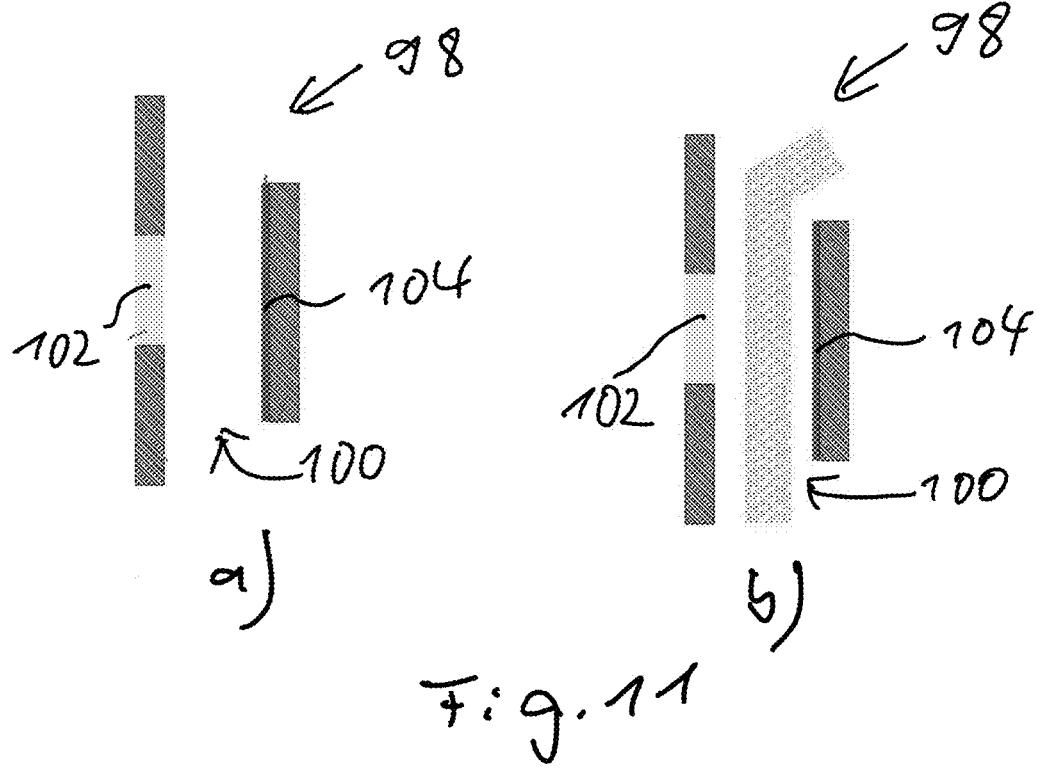

FIG. 11 shows a fluidic display device 98, which can also be used in connection with all of the aforementioned embodiments.

The display device 98 comprises a fluid channel section 100 shown only schematically, which can either be supplied with cooling and/or lubricating fluid.

The fluid channel section 100 is delimited on one side by a window 102 and on an opposite side by a signal surface 104 formed by a colored surface in the embodiment shown in FIG. 11.

If no fluid is flowing in the fluid channel section 100 (see FIG. 11 a)), the signal surface 104 can be detected through the window 102.

However, when a fluid flows in the fluid channel section 100 (see FIG. 11 *b*)), the signal surface 104 can only be regarded through the fluid. Thus, when regarded through the window 102, the signal surface 104 can have a darker or more grayish appearance compared to the initial state. It can then be determined whether a fluid flows in the fluid channel section 100.

The display device 98 can in principle be used in conjunction with any flow channel of any of the embodiments described above. For example, it can be used in conjunction with the outlet channels 78, 80 of the fifth embodiment. It can then be readily recognized from the outside which outlet channel 78, 80 is currently in use.

The same applies to the fluid outlet channels 52*a*, 52*b* of the fourth embodiment.

In the first embodiment, the cooling fluid can be directed into a fluid channel section 100 of a display device 98 when an associated cutting insert 16*a*, 16*b* is mounted incorrectly.

Figure 12:
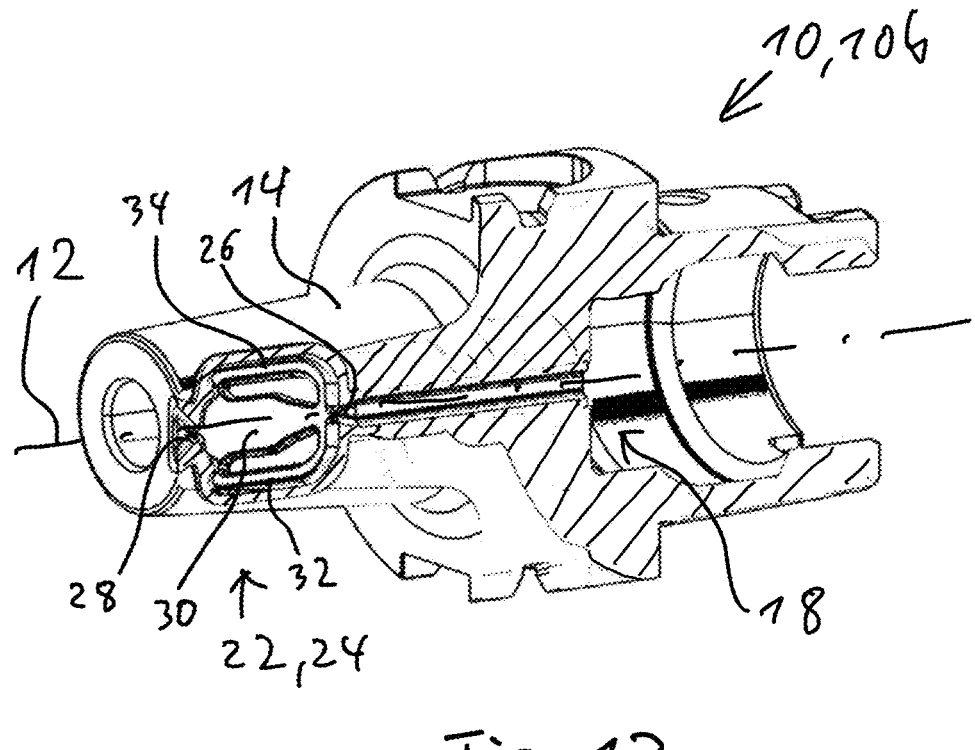

FIG. 12 shows a cutting system component 10 embodied as tool holder 10*b*. This can be referred to as the sixth embodiment.

In the illustrated example, the tool holder 10*b* is embodied as a chuck.

A fluid inlet 18 is provided on the base body 14 of the tool holder 10*b*, through which the tool holder 10*b* can be supplied with cooling and/or lubricating fluid.

Further, a fluidic actuator 22 in the form of a fluidic oscillator 24 is arranged inside the base body 14.

With respect to its function and geometry, this fluidic oscillator 24 substantially corresponds to the fluidic oscillator 24*a* already explained in FIGS. 1 and 2. Reference is therefore made to the explanations above. Since only a single fluidic oscillator 24 is provided in the embodiment according to FIG. 12, its elements are labeled with reference symbols without the suffixes a, b.

The invention claimed is:

1. A cutting tool system component comprising a base body, including a fluid inlet for supplying cooling and/or lubricating fluid to the cutting tool system component, wherein a fluidic actuator is arranged in the interior of the base body and has a fluid-conducting connection to the fluid inlet, wherein the fluidic actuator comprises a fluidic oscillator, the fluidic oscillator comprising:

a fluid outlet positioned proximate a cutting edge or a flute;

a main flow channel fluidly connecting the fluid inlet to the fluid outlet;

a first return flow channel; and a second return flow channel;

wherein the first and second return flow channels allow fluid moving through the main flow channel toward the fluid outlet to return to the main flow channel to cause a fluid jet to oscillate as it exits the fluid outlet.

2. The cutting tool system component of claim 1, wherein the fluid outlet is directed to a center-section of a cutting edge or a flute, and the fluidic oscillator is formed to oscillatingly guide the fluid jet exiting from the fluid outlet relative to the cutting edge or the flute when in operation.

3. The cutting tool system component of claim 1, wherein a wall deformably delimiting the return flow channel is designed at least in sections such that a cross section of the return flow channel changes by deforming the wall.

4. The cutting system component of claim 1, wherein the fluidic actuator comprises a tempering surface and a fluid channel section, wherein the fluid channel section has a fluid connection to the fluid inlet and is directed towards the tempering surface such that fluid flowing from the fluid channel section flows along the tempering surface and is deflected as a function of a temperature of the tempering surface.

5. The cutting tool system component of claim 1, further comprising a fluidic detector, wherein the fluidic detector comprises a detector channel that has a fluid-conducting connection to the fluid inlet and terminates into an environment of the cutting tool system component to detect an object adjacent to the cutting tool system component.

6. The cutting system component of claim 1, further comprising a fluidic detector, wherein the fluidic detector is formed by a fluid channel section, having a fluid-conducting connection to the fluid inlet, wherein an add-on part fully closes the fluid channel section when seated correctly, and at least partially opens the fluid channel section if seated incorrectly, such that an incorrect seat of the add-on part is detectable by means of the fluidic detector.

7. The cutting tool system component of claim 1, further comprising a fluidic detector, wherein the fluidic detector is a rotational speed detector comprising a fluid chamber having a fluid-conducting connection to the fluid inlet and having a fluid outlet, wherein, in operation, a pressure of fluid exiting the fluid outlet is a function of the rotational speed of the cutting tool component.

8. The cutting tool system component of claim 1, wherein a fluidic logic element is arranged inside the base body, wherein the fluidic logic element has a fluid connection to the fluid inlet and to the fluidic actuator.

9. The cutting tool system component of claim 8, wherein the fluidic logic element comprises a fluidic XOR circuit, a fluidic OR circuit, a fluidic AND circuit, and/or a fluidic NOT circuit.

10. The cutting tool system component of claim 1, wherein the component is a cutting tool.

11. The cutting tool system component of claim 1, wherein the component is a cutting tool holder.

12. The cutting tool system component of claim 1, wherein a fluidic display device, having a fluid channel section that can either be supplied with coolant and/or lubricating fluid, wherein the fluid channel section is delimited on a first side by a window and is at least sectionally delimited on a second side opposite to the first side by a signal surface, or wherein the fluid channel section exits into an environment of the cutting tool system component.

13. The cutting tool system component of claim 1, wherein the base body is manufactured by means of an additive manufacturing process.

14. The cutting tool system component of claim 13, wherein the fluidic actuator and/or a fluidic logic element is/are manufactured at least sectionally by means of the additive manufacturing process.

15. The cutting tool system component of claim 1, wherein the fluid outlet of the fluidic oscillator causes the fluid jet to exit into open air.

16. The cutting tool system component of claim 1, wherein the base body is a single component that includes the fluid outlet, the main flow channel, the first return flow channel, and the second return flow channel of the fluidic oscillator.

* * * * *